April 30, 1940.  F. L. MAIN  2,198,878

BRAKE MECHANISM

Filed March 23, 1936  4 Sheets-Sheet 1

INVENTOR
FRANK L. MAIN
BY
ATTORNEYS

April 30, 1940.  F. L. MAIN  2,198,878
BRAKE MECHANISM
Filed March 23, 1936   4 Sheets-Sheet 2
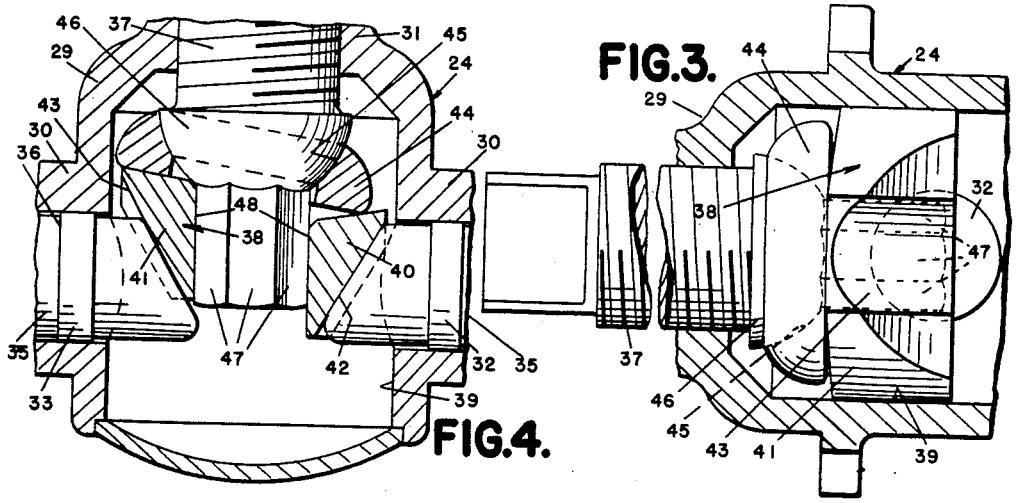
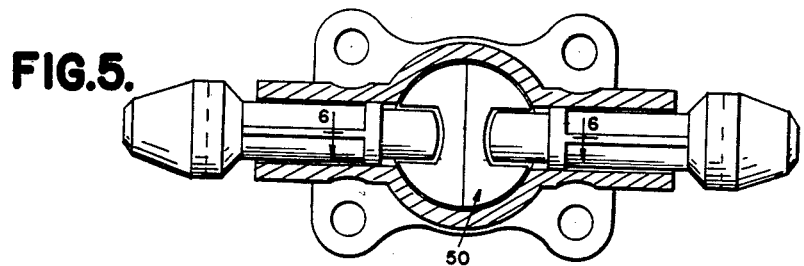
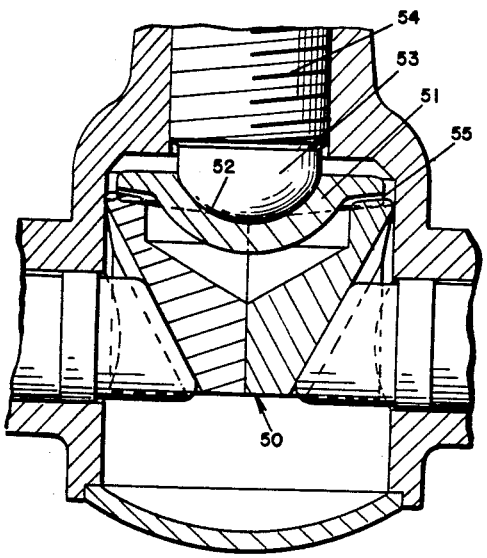
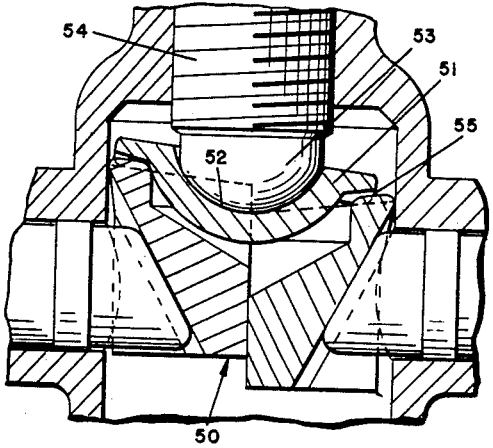
*INVENTOR*
FRANK L. MAIN
*ATTORNEYS*

April 30, 1940.  F. L. MAIN  2,198,878
BRAKE MECHANISM
Filed March 23, 1936  4 Sheets-Sheet 3
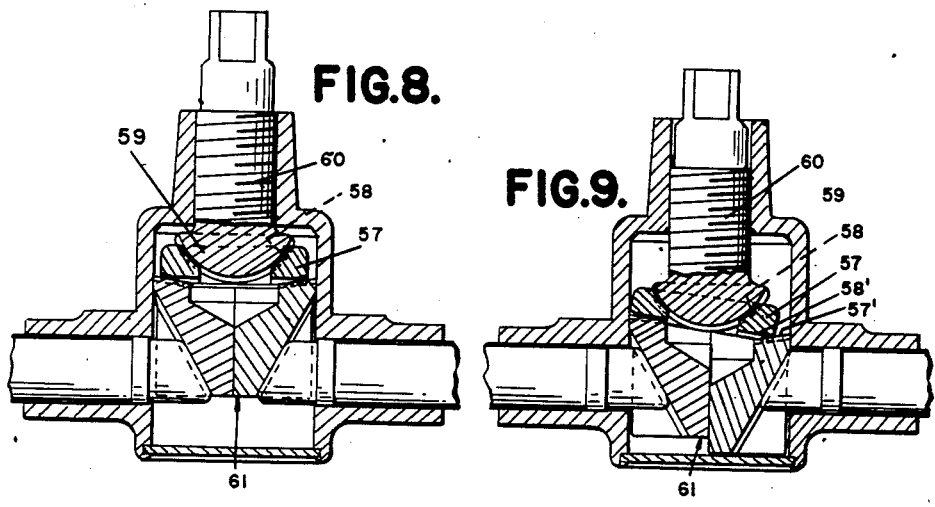
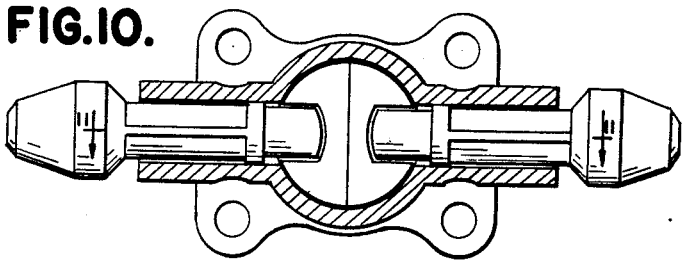
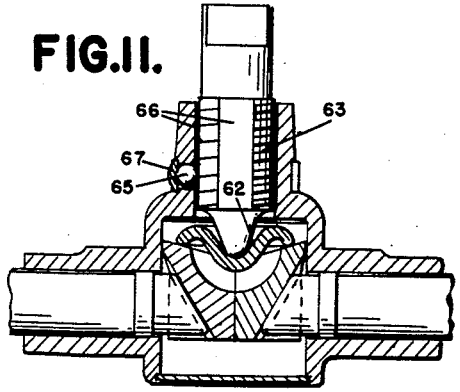
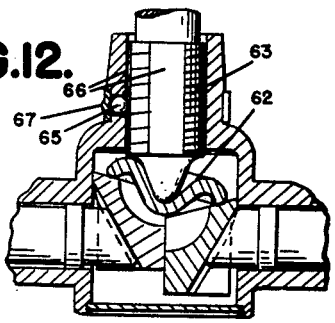
INVENTOR
FRANK L. MAIN
BY *Whittemore Hulbert & Whittemore Belknap*
ATTORNEYS April 30, 1940.  F. L. MAIN  2,198,878
BRAKE MECHANISM
Filed March 23, 1936   4 Sheets-Sheet 4

*INVENTOR*
FRANK L. MAIN
BY *Whittemore Hulbert Whittemore Belknap*
*ATTORNEYS*

Patented Apr. 30, 1940

2,198,878

UNITED STATES PATENT OFFICE 2,198,878

BRAKE MECHANISM

Frank L. Main, Birmingham, Mich., assignor to Kelsey-Hayes Wheel Company, Detroit, Mich., a corporation of Delaware Application March 23, 1936, Serial No. 70,432

20 Claims. (Cl. 188—79.5)

This invention relates generally to brake mechanism and refers more particularly to adjustment anchor devices for brake shoes.

In brakes having their friction linings formed of the same material, the friction linings of the primary shoes usually wear to a greater extent than the friction linings of the secondary shoes and it is therefore one of the principal objects of the present invention to automatically compensate for this differential wear at the time of adjustment of the shoes relative to the cooperating brake flange.

Another advantageous feature of the present invention resides in the provision of an adjustment anchor device wherein lost motion is entirely eliminated and wherein a limited amount of torque may be transmitted from one shoe to the other to provide controlled servo action.

The foregoing, as well as other objects, will be made more apparent as this description proceeds, especially when considered in connection with the accompanying drawings, wherein:

Figure 3 is a sectional view taken substantially on the plane indicated by the line 3—3 of Figure 1;

Figure 4 is a detailed sectional view taken substantially on the plane indicated by the line 4—4 of Figure 1 and showing the parts in a different position;

Figure 5 is a plan view, partly in section, of a modified form of adjustment anchor device;

Figure 6 is a sectional view taken substantially on the plane indicated by the line 6—6 of Figure 5;

Figure 7 is a view similar to Figure 6 showing the parts in a different position;

Figure 8 is a longitudinal sectional view through another modified form of adjustment anchor device;

Figure 9 is a similar sectional view showing the parts in a different position;

Figure 10 is a sectional view showing a further modified form of the invention;

Figure 11 is a sectional view taken substantially on the plane indicated by the line 11—11 of Figure 10;

Figure 12 is a view similar to Figure 11 showing the parts in a different position;

Figure 1:
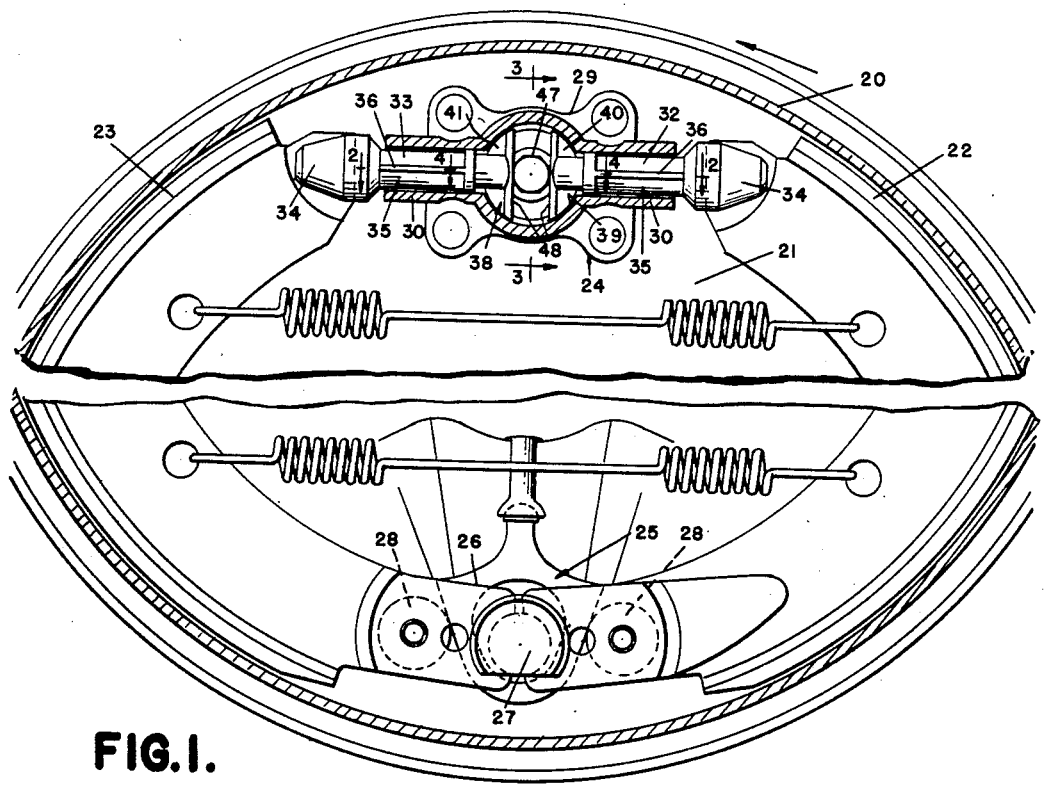
Figure 1 is a side elevation, partly in section of mechanism featuring my improved anchor adjustment device.

The brake mechanism illustrated in Figures 1 to 4 inclusive comprises a brake drum 20, a backing plate 21 and a pair of brake shoes 22 and 23 supported within the drum. The brake shoes have spaced ends anchored upon the backing plate 21 through the medium of the anchor adjustment device 24 and having the opposite ends spaced from each other for engagement by a suitable actuator 25 effective to force the shoes outwardly into frictional contact with the brake flange of the drum 20. In the present illustrative embodiment of the invention, the upper ends of the shoes are adapted to be anchored upon the backing plate 21 by the adjustment anchor device 24 and the lower ends of the shoes are adapted to be engaged by the actuator 25.

The actuator selected herein for the purpose of illustration is such as to permit circumferential displacement of the shoes in the drum and briefly comprises a floating wedge 26 supported upon the backing plate for radial movement between the lower ends of the shoes, by means of a stud 27. As indicated in Figure 1, the stud 27 permits limited floating movement of the wedge and the opposite sides of the wedge diverge upwardly forming cam faces for engagement with rollers 28 carried by the lower ends of the shoes.

Assuming that the brake drum 20 is adapted to be rotated in the direction indicated by the arrow in Figure 1, the brake shoe 22 is the primary or leading shoe and the brake shoe 23 is the secondary or trailing shoe. As stated above, the friction lining of the primary shoe 22 usually wears at a faster rate than the friction lining of the secondary shoe and in accordance with this invention, this differential wear is automatically compensated for during adjustment by the anchor device 24.

The anchor device 24 is located between the spaced upper ends of the shoes and comprises an anchor bracket 29 riveted or otherwise fixedly secured to the backing plate 21. Upon reference to Figure 2, it will be noted that the bracket 29 is provided with axially aligned tubular extensions 30 located in the drum and is also formed with a transverse internally threaded portion 31 extending through the backing plate. The tubular portions 30 of the anchor bracket 29 slidably receive the links 32 and 33 having head portions 34 at the outer ends slotted to receive the adjacent ends of the brake shoes. In the present instance, the brake shoes are of T-section and the upper ends of the stems or webs engage in the slots of the heads and are adapted to abut the end wall of these slots.

To provide for movement of the anchored ends of the brake shoes radially outwardly upon outward swinging of these shoes and to thereby permit more complete frictional engagement of the linings of the shoes with the brake flange, the stems 35 of the adjustment links having an outer diameter slightly smaller than the internal diameter of the tubular portions 30 so as to render it possible for the adjustment links to move angularly in the tubular portions through paths parallel to the brake shoes. In order to prevent transverse movement of the adjustment links in the tubular portions 30, the stems of the links are provided with diametrically opposed projections 36 in the nature of longitudinally extending ribs for engaging the inner and outer side walls of the tubular portions. It will be understood that there is a slight clearance between the ribs and aforesaid side walls of the tubular portions sufficient to permit the required angular movement of the adjustment links.

For adjusting the links aforesaid, I provide a screw 37 threadedly engaging the portion 31 of the bracket and having an exposed polygonally shaped end for engagement by a suitable tool, such as a wrench. Cooperating with the screw to effect the foregoing result is a wedge 38 located in a bore 39 in the anchor bracket between the inner ends of the adjustment links. The wedge 38 is shown in Figure 1 as formed of two complementary sections 40 and 41 free from direct connection with each other. The section 40 is formed with a groove 42 in the inclined surface thereof for receiving the inner end of the link 32 connected to the primary shoe 22, while the section 41 is formed with a similar groove 43 in the inclined surface thereof for receiving the inner end of the adjustment link 33 connected to the secondary shoe 23.

Figure 2:
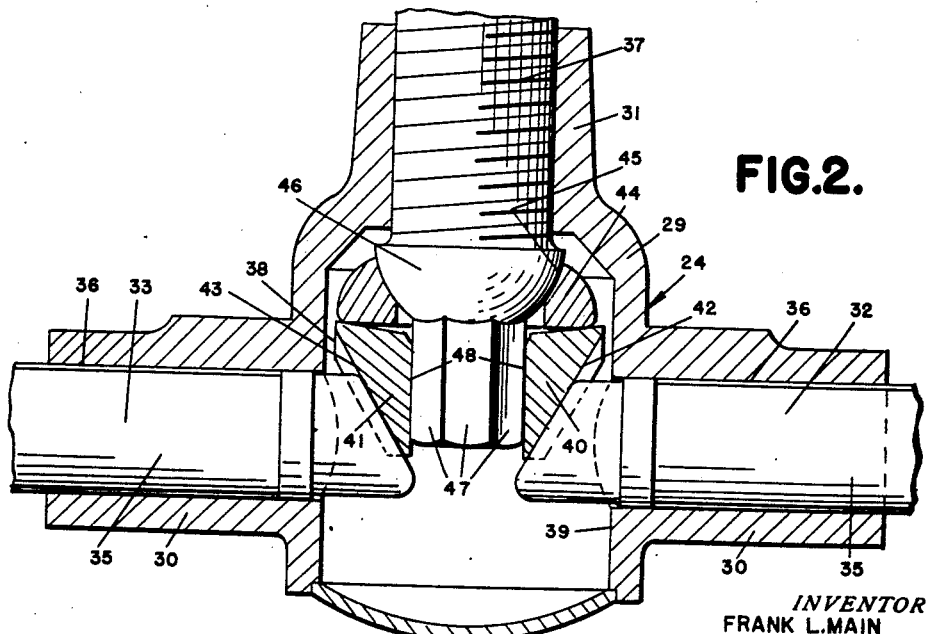
Figure 2 is a sectional view taken substantially on the plane indicated by the line 2—2 of Figure 1.

It will be observed from Figure 2 that the complementary sections of the wedge 38 are disposed upon opposite sides of the inner end of the screw 37 and the outer sides of the complementary sections are seated upon an equalizer ring 44 having a spherically shaped seat portion 45 engageable with a correspondingly shaped enlargement 46 on the screw 37. In the construction illustrated, the outer surfaces of the complementary sections of the wedge are disposed at such an angle with respect to the inner surfaces, that when the latter are in engagement with the opposite sides of the inner portion of the screw, the outer surfaces have a reduced area of engagement with the equalizer ring so as to provide for independent axial adjustment of the two sections of the wedge in the manner shown in Figure 4.

With the construction thus far described, it will be noted that as the screw 37 is moved inwardly, a corresponding movement is transmitted to the wedge 38 through the equalizer ring 44 and since this wedge engages the inner ends of the adjustment links, it necessarily follows that the latter will be moved outwardly with respect to the anchor bracket to decrease the clearance between the brake shoes and brake flange of the drum. In actual practice, the shoe having the lining of least wear is moved into contact with the drum by the associated section of the wedge before the lining on the other shoe is moved into contact with the brake flange. After this preliminary step in the adjustment has been effected, continued advancement of the screw 37 effects a tilting movement of the equalizer ring 44 until the lining of greatest wear is brought into contact with the brake flange by its associated wedge section. The screw 37 is then retracted the desired amount to effect the required clearance between the shoes and brake flange.

Attention is called to the fact that the end of the screw between the complementary sections of the wedge is of polygonal shape in cross section or, in other words, is formed with a plurality of flats 47 successively engageable with the inner planular surfaces 48 of the complementary sections of the wedge. These flats are pre-determined to provide for obtaining the desired increments of adjustment and to supply a lock for the adjustment. In addition, with the above construction, a certain amount of the torque transferred from one shoe to the other is taken by the inner end of the screw, and this is desirable in that it prevents the servo from locking the brake. However, the construction renders it possible to transfer a limited amount of torque from one shoe to the other, as evidenced by the fact that the equalizer ring is mounted on the screw for oscillation transversely of the axis of the screw. Assuming, for example, that torque is transferred from the primary to the secondary shoe, it will be noted that the link 32 in moving inwardly under the action of the torque will displace the section 40 of the wedge outwardly slightly and in so doing, tilts the side of the equalizer 44 engaging the section 41 of the wedge inwardly. This results in effecting a corresponding outward movement of the secondary shoe toward the brake flange through the adjustment link 33. Attention is called to the fact that a certain amount of friction is set up by the engagement of the equalizer with the seat 46 on the screw and this friction also tends to limit the amount of servo or torque transmitted.

The embodiment of the invention illustrated in Figures 5 to 7 inclusive differs from the one previously described in that the complementary sections of the two part wedge 50 abut each other at the inner sides thereof and the equalizer 51 has a spherical recess 52 in the outer surface thereof adapted to seat upon the spherical inner end 53 of the adjusting screw 54. In this embodiment, the outer surface of the wedge 50 and the inner surface of the equalizer 51 are formed with cooperating projections and recesses 55 engageable with each other to provide increments of adjustment and to supply a lock for the adjustment. The principle of operation of this construction is the same as the one previously described, insofar as adjustment is concerned and, accordingly, a detailed description of the same is believed unnecessary. However, it is to be noted that the amount of torque transmitted from one shoe to the other, in the present modification, is not only resisted by the friction provided by the abutting surfaces of the complementary sections of the wedge, but is also resisted by the friction engagement of the equalizer with the inner end of the screw 54. It will, of course, be understood that this friction may be increased or decreased as desired by merely reducing the friction at one or both of the above points.

The modification form of the invention featured in Figures 8 and 9 differs from the one featured in Figures 5 to 7 inclusive in that the equalizer is in the form of a ring 57 having a spherical seat 58 seated upon the spherical head portion 59 of the screw 60 and having an inner surface engageable with the outer surfaces of the two complementary sections of the wedge 61. In this embodiment of the invention, the spherical seat 58 and spherical head portion 59 on the screw are provided with cooperating projections and recesses to establish a lock for the adjustment and to give the desired increments of adjustment. In this connection, attention is called to the fact that the outer surface of the wedge is provided with a projection 57' engageable in a groove 58' to lock the equalizer against rotation relative to the wedge. The principle of operation of the device to effect the adjustment is the same as hereinbefore described with the first form of this invention.

The embodiment of the invention illustrated in Figures 10 to 12 inclusive is similar to the modification shown in Figures 5 to 7 inclusive, but differs therefrom in that the frictional engagement between the equalizer 62 and the upper end of the screw 63 is relatively small and thereby permits a greater amount of torque to be transmitted from one shoe to the other through the complementary sections of the wedge 64. Also, in the construction shown in Figures 10 to 12 inclusive, the increments of adjustment are obtained by means of a detent 65 normally urged into engagement with the flats 66 on the adjusting screw 63 by means of a spring retainer 67. This construction not only provides for obtaining predetermined increments of adjustment, but also serves to lock the screw in adjusted position. As will be apparent from Figure 12, the equalizer functions in the same manner as described in the first form of this invention in obtaining the desired adjustment of the shoes and in automatically compensating for the differential wear of the friction surfaces of the shoes.

Figure 13:
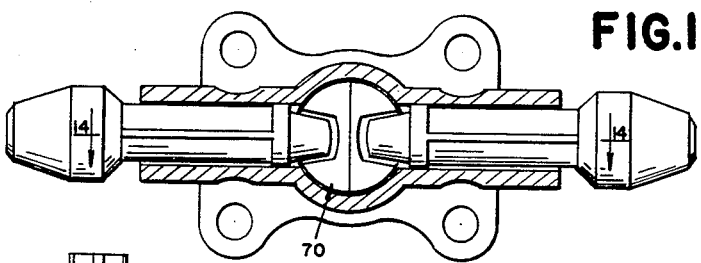
Figure 13 is an elevational view, partly in section, of a further embodiment of this invention.
Figure 14:
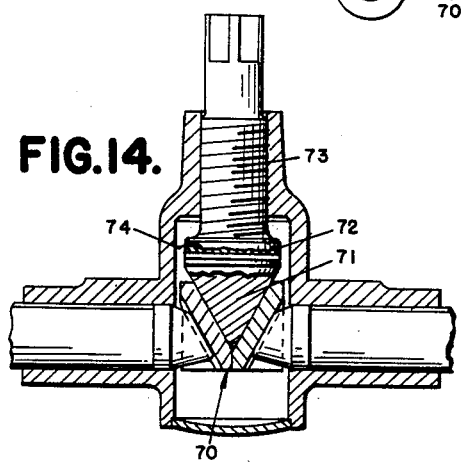
Figure 14 is a sectional view taken substantially on the plane indicated by the line 14—14 of Figure 13.
Figure 15:
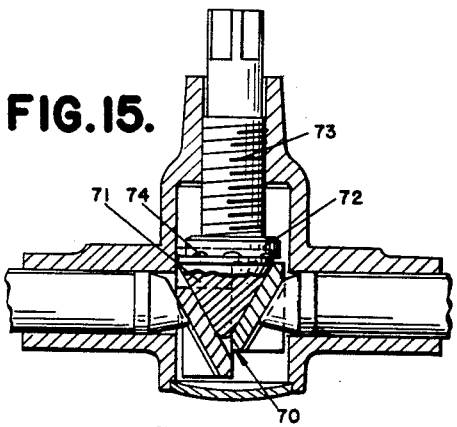
Figure 15 is a view similar to Figure 14 showing the parts in a different position.

In the modification shown in Figures 13 to 15 inclusive, the complementary sections of the wedge 70 are slidably supported upon a conically shaped member 71 having the outer surface thereof engaging the inner surface of an enlarged head 72 formed on the inner end of the screw 73. Upon reference to Figure 15, it will be noted that this construction also provides for adjusting the shoes to automatically compensate for differences in wear of the friction surfaces of the shoes and the desired increments of adjustment are secured by a projection on the wedge successively engageable within the radial grooves 74 formed on the inner surface of the head 72 of the screw. Inasmuch as the member 71 is separate from the screw 73, it necessarily follows that the foregoing may be shifted circumferentially relative to the latter and this provides for transmitting torque from one shoe to the other.

Figure 16:
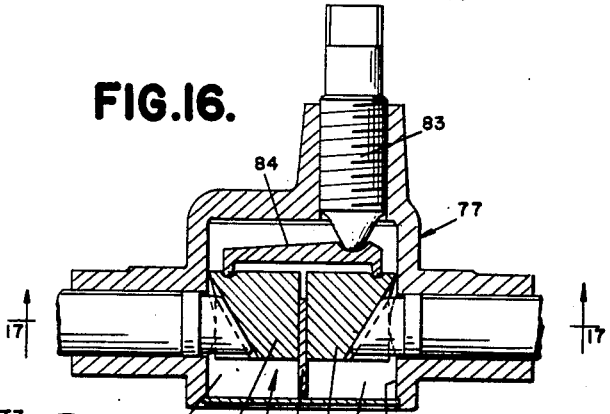
Figure 16 is a longitudinal sectional view through still another embodiment of the invention.
Figure 17:
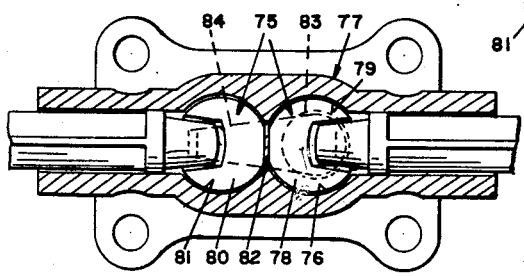
Figure 17 is a sectional view taken substantially on the plane indicated by the line 17—17 of Figure 16.

In the modified form of construction shown in Figures 16 and 17, the complementary sections of the wedge 75 are slidably supported in separate compartments in the bore 76 of the anchor bracket 77. In detail, the wedge section 78 for actuating the primary shoe is slidably supported in the compartment 79 and the wedge section 80 for actuating the secondary shoe is slidably supported in the compartment 81. As shown in Figure 16, the inner surfaces of the complementary sections slidably engage the opposite sides of the partition 82 separating the compartments, and relative adjustment of the complementary sections of the wedge is effected by means of a screw 83 and an equalizer 84. The screw 83 is threadedly mounted in the anchor bracket and is offset with respect to the axis of the bore so as to engage the equalizer at a point in close proximity to the end of the same engaging the wedge 78 for the primary shoe. In actual practice, the construction is such as to afford a leverage of 5 to 1 in favor of the primary shoe, since it has been found that the friction lining of the primary shoe may vary in this proportion to the secondary shoe. It will, of course, be understood that this leverage will also resist to a great extent, the torque transmitted from the primary shoe to the secondary shoe and, consequently, provides for controlling the amount of servo.

While a number of different embodiments have been selected herein for the purpose of illustrating this invention, nevertheless, it will be noted that all of the modifications possess certain common features. For example, in each embodiment, provision is made for automatically compensating for differences in wear of the primary and secondary shoes at the time of adjustment. In addition, each of the constructions is such as to permit the transmission of a limited amount of torque from one shoe to the other through the adjusting device.

What I claim as my invention is:

1. In a brake mechanism, a brake drum having a brake flange, shoes within the drum engageable with the flange and having spaced ends, means for adjusting the shoes to vary the clearance between the same and flange, said means including a pair of members movable transversely of the shoes between said ends for respectively moving the ends of the shoes outwardly, a rotatable element for feeding the members relative to the ends of the shoes, and means effective upon movement of the element in one direction to move the members throughout distances which vary in accordance with variations in the differences in wear between the shoes.

2. In a brake mechanism, a brake drum having a brake flange, shoes within the drum engageable with the flange and having spaced ends, means for adjusting the shoes to vary the clearance between the same and flange, said means including a pair of members movable transversely of the shoes between said ends for respectively moving the ends of the shoes outwardly, and a rotatable element for moving the members independent of each other to adjust one of the shoes throughout a greater distance than the other.

3. In a brake mechanism, a brake drum having a brake flange, shoes within the drum engageable with the flange and having spaced ends, means for adjusting the shoes to vary the clearance between the same and flange, said means including a pair of members movable transversely of the shoes between said ends for respectively moving the ends of the shoes outwardly, a rotatable element for feeding the members relative to the ends of the shoes, and an equalizer member mounted on the rotatable element for oscillation in directions transverse to the paths of travel of the members and engageable with said members to move the latter throughout distances which vary in accordance with variations in the different rates of wear of the shoes.

4. In a brake mechanism, a brake drum having a brake flange, shoes within the drum engageable with the flange and having spaced ends, means for adjusting the shoes to vary the clearance between the same and flange, said means including a bracket fixed relative to the drum and having a bore extending transversely of the shoes between the ends aforesaid of the shoes, a pair of members movable axially of the bore and respectively operable to move the shoes outwardly, an actuating element for the members supported on the bracket for movement axially of the bore, and means between the element and members effective upon movement of the former in one direction to move the members throughout different distances dependent upon the differences in wear between the shoes.

5. In a brake mechanism, a brake drum having a brake flange, shoes within the drum engageable with the flange and having spaced ends, means for adjusting the shoes to vary the clearance between the same and flange, said means including a pair of members movable transversely of the shoes between said ends for respectively moving the ends of the shoes outwardly, a rotatable element for feeding the members relative to the ends of the shoes, and an equalizer having a seat on the rotatable element providing universal movement thereof and engageable with said members to move the latter upon movement of said element in one direction.

6. In a brake mechanism, a brake drum having a brake flange, shoes within the drum engageable with the flange and having spaced ends, means for adjusting the shoes to vary the clearance between the same and flange, said means including a pair of members movable transversely of the shoes between said ends for respectively moving the ends of the shoes outwardly, an actuating element for the members supported for movement transversely of the shoes and having the inner end thereof extending between said members, a spherically shaped shoulder on the element spaced outwardly from the members, and an equalizer ring seated on the shoulder for universal movement relative to the element and engageable with the adjacent ends of the members for advancing the same from the element.

7. In a brake mechanism, a brake drum having a brake flange, shoes within the drum engageable with the flange and having spaced ends, means for adjusting the shoes to vary the clearance between the same and flange, said means including a pair of members movable transversely of the shoes between said ends for respectively moving the ends of the shoes outwardly, an actuating element for the members supported for movement transversely of the shoes and having the inner end thereof extending between said members, a spherically shaped shoulder on the element spaced outwardly from the members, an equalizer ring seated on the shoulder for universal movement relative to the element and engageable with the adjacent ends of the members for advancing the same from the element, and flats on the inner end of the element cooperating with the adjacent faces of the members to indicate predetermined increments of adjustment of the members.

8. In a brake mechanism, a brake drum having a brake flange, shoes within the drum engageable with the flange and having spaced ends, means for adjusting the shoes to vary the clearance between the same and flange, said means including a pair of members movable transversely of the shoes between said ends for respectively moving the ends of the shoes outwardly, a rotatable element for feeding the members relative to the ends of the shoes, means effective upon movement of the element in one direction to move the members throughout distances dependent upon the differences in wear between the shoes, and means for indicating predetermined increments of adjustment of the members.

9. In a brake mechanism, a brake drum having a brake flange, shoes within the drum engageable with the flange and having spaced ends, means for adjusting the shoes to vary the clearance between the same and flange, said means including a pair of members movable transversely of the shoes between said ends for respectively moving the ends of the shoes outwardly and having the adjacent sides slidably engaging each other, an element supported for movement in the direction of the members for actuating the latter, and means effective upon movement of the element in one direction to move the members throughout different distances dependent upon the differences in wear between the shoes.

10. In a brake mechanism, a brake drum having a brake flange, shoes within the drum engageable with the flange and having spaced ends, means for adjusting the shoes to vary the clearance between the same and flange, said means including a pair of members movable transversely of the shoes between said ends for respectively moving the ends of the shoes outwardly and also movable circumferentially of the drum to a limited extent, an element supported for movement in the direction of the members for actuating the latter, and means effective upon movement of the element in one direction to move the members throughout different distances dependent upon the differences in wear between the shoes.

11. In a brake mechanism, a brake drum having a brake flange, shoes within the drum engageable with the flange and having spaced ends, means for adjusting the shoes to vary the clearance between the same and flange, said means including a pair of members movable transversely of the shoes between said ends for respectively moving the ends of the shoes outwardly and having the adjacent sides slidably engaging each other, an element supported for movement in the direction of the members for actuating the latter, and an equalizer plate fulcrumed on the inner end of the element for rocking movement transversely to the axis of the element and engageable with the adjacent ends of the members to move the latter.

12. In a brake mechanism, a brake drum having a brake flange, shoes within the drum engageable with the flange and having spaced ends, means for adjusting the shoes to vary the clearance between the same and flange, said means including a bracket fixed relative to the drum and having a bore extending transversely of the shoes between the ends aforesaid of the shoes, a pair of members movable axially of the bore for respectively moving the ends of the shoes outwardly and having the adjacent sides slidably engageable with each other, an actuating element for the members supported on the bracket for movement axially of the bore, and an equalizer plate fulcrumed on the inner end of the element for rocking movement transversely to the axis of the element and engageable with the adjacent ends of the members to move the latter.

13. In a brake mechanism, a brake drum having a brake flange, shoes within the drum engageable with the flange and having spaced ends, means for adjusting the shoes to vary the clearance between the same and flange, said means including a pair of members movable transversely of the shoes between said ends for respectively moving the latter outwardly, an actuating element for the members supported for movement in the direction of travel of the members, means effective upon movement of the element in one direction to move one of the members at a greater rate than the other comprising a compensator extending transversely to the path of travel of the element and having the opposite ends respectively engaging the adjacent ends of the members, said compensator being fulcrumed on the inner end of the element at a point adjacent the end of the same engaging the member to be moved at the increased rate.

14. In a brake mechanism, a brake drum having a brake flange, shoes within the drum engageable with the flange and having the ends at one side of the drum spaced from each other, means for adjusting the shoes to vary the clearance between the same and flange, said means including a pair of members supported for movement independently of each other transversely of the shoes between said ends, means between the said ends of the shoes and sides of the members adjacent said ends effective upon movement of the members transversely of the shoes to vary the clearance between the latter and brake flange, and a single adjusting element for moving said members.

15. In a brake mechanism, a brake drum having a brake flange, shoes within the drum engageable with the flange and having the ends at one side of the drum spaced from each other, means for adjusting the shoes to vary the clearance between the same and brake flange, said means including a pair of members supported for movement independently of each other transversely of the shoes between said ends for respectively moving the shoes outwardly and having portions of the adjacent sides frictionally engaging each other, and a single adjusting element operatively connected to both members for adjusting the same.

16. In a brake mechanism, a brake drum having a brake flange, shoes within the drum engageable with the brake flange and having the ends at one side of the drum spaced from each other, means for adjusting the shoes to vary the clearance between the same and flange, said means including a wedge comprising complementary sections supported for movement independently of each other transversely of the shoes between said ends for respectively moving the shoes outwardly and having a limited movement circumferentially of the drum, and a single adjusting element operatively connected to both sections of the wedge for adjusting the latter.

17. In a brake mechanism, a brake drum having a brake flange, shoes within the drum engageable with the brake flange and having the ends at one side of the drum spaced from each other, means for adjusting the shoes for varying the clearance between the same and brake flange, said means including a pair of members supported for movement independently of each other transversely of the shoes between said ends and having portions of the outer surfaces thereof inclined, means between the said ends of the shoes and inclined surfaces of the members for moving the shoes upon movement of the members transversely of said shoes, a compensating member bridging the members aforesaid and engageable therewith, and an adjustable element engaging the compensator for moving both members through said compensator.

18. In a brake mechanism, a brake drum having a brake flange, shoes within the drum engageable with the brake flange and having the ends at one side of the drum spaced from each other, means for adjusting the shoes to vary the clearance between the same and flange, said means including a pair of members movable transversely of the shoes between said ends for respectively moving the shoes outwardly and spaced from each other circumferentially of the drum, an adjusting element for the members having one end extending between said members and engageable with the adjacent surfaces thereof, and a compensator supported upon the adjusting element for rocking movement transversely of said element and engageable with said members for moving the latter upon adjustment of said element.

19. In a brake mechanism, a brake drum having a brake flange, shoes within the drum engageable with the brake flange and having the ends at one side of the drum spaced from each other, means for adjusting the shoes to vary the clearance between the same and flange, said means including a pair of members movable transversely of the shoes between said ends and spaced from each other circumferentially of the drum, an adjusting element for the members having one end extending between said members and engageable with the adjacent surfaces thereof, means between the said ends of the shoes and the sides of the members adjacent said ends effective upon movement of the members to vary the clearance between the shoes and brake flange, a compensator supported upon the adjusting element for movement transversely of said element and engageable with said members for moving the latter upon adjustment of said element, and cooperating means on the adjacent surfaces of the members and portion of the adjusting element extending therebetween for indicating predetermined increments of adjustment of the members.

20. In a brake mechanism, a brake drum having a brake flange, shoes within the drum engageable with the flange and having spaced ends, means for adjusting the shoes to vary the clearance between the same and flange, said means including a pair of separate members supported between the ends of the shoes for movement transversely of the latter to independently adjust said ends outwardly, and a single adjusting element for effecting movement of both members.

FRANK L. MAIN.